Dec. 6, 1938.  H. STEINER  2,139,425

FLOATING PISTON INTERNAL COMBUSTION ENGINE

Filed March 8, 1935   3 Sheets-Sheet 1

Inventor:
Hans Steiner
per Karl A. May
Attorney.

Fig. 8.

Patented Dec. 6, 1938

2,139,425

UNITED STATES PATENT OFFICE 2,139,425

FLOATING PISTON INTERNAL COMBUSTION ENGINE

Hans Steiner, Winterthur, Switzerland, assignor to Sulzer Frères, Societe Anonyme, Winterthur, Switzerland Application March 8, 1935, Serial No. 10,080
In Switzerland March 13, 1934

27 Claims. (Cl. 123—52)

The present invention relates to an internal combustion engine having floating pistons and directly associated with a reciprocating compressor, the pistons of which are directly connected with the power pistons of the internal combustion engine, said engine comprising at least two cylinders and at least one piston in each cylinder and operating in such a manner that the expansion stroke of one motor piston coincides with the compression stroke of another motor piston.

An object of the present invention resides in the provision of an internal combustion engine of the type specified having floating pistons and in which not only part of the energy of the piston carrying out an expansion stroke is transmitted to the piston carrying out a compression stroke, but also part of the excess kinetic energy transmitted to the motor piston carrying out a compression stroke is retransmitted back to the piston carrying out an expansion stroke.

A further object of the present invention resides in the provision of an internal combustion engine of the type specified above in which the kinetic energy available from one motor piston is transmitted to another by means of columns of liquid arranged intermediary the motor pistons, and efficient and smooth operation is assured by this hydraulic connection of the motor pistons which transmits energy in two directions.

Another object of this invention is to provide an internal combustion engine of the type above specified having two pistons within each cylinder operating in opposite directions and in which columns of liquid are arranged in between the pistons moving in the same direction or in between pistons operating in opposite directions.

A further object of this invention resides in providing an internal combustion engine having a plurality of cylinders containing counter-moving motor pistons which are interconnected by hydraulic means and can be operated at high speed without vibrations and knocking because there are no mechanical means such as heavy rods and the like for alternatingly transmitting tractive and pressure forces which cause rapid wear.

Another object of the present invention is to provide an internal combustion engine of the type specified in which the movement of the pistons from dead center position starts with great acceleration, whereby the thermal efficiency is improved and whereby the kinetic energy caused by the great acceleration of the pistons carrying out a compression stroke is directly transmitted to the pistons carrying out an expansion stroke and transformed into useful work.

An object of the present invention is the provision of a synchronizing means for internal combustion engines of the type specified which assures equal speeds of the counter-moving pistons at all stages of operation and which exactly keeps constant the position of the pistons with respect to the dead center position.

A further object of this invention resides in the provision of automatic adjusting means assuring adjustment and maintainance of the pressure of the liquid which is used for interconnecting the motor pistons in internal combustion engines of the type specified.

Another object of the present invention is to provide automatic indicating and adjusting means assuring adjustment and maintenance of the pressure of the liquid which is used for interconnecting the power pistons in internal combustion engines of the type specified and automatic cut out means which stop the engine when the action of said adjusting means does not suffice to overcome irregularities in the pressure of the operating liquid in the hydraulic transmission.

Further and other objects of the present invention will be hereinafter set forth in the accompanying specification and claims and shown in the drawings which, by way of illustration, show what I now consider to be a preferred embodiment of my invention.

Figures 1, 2, 5, 6, 7:
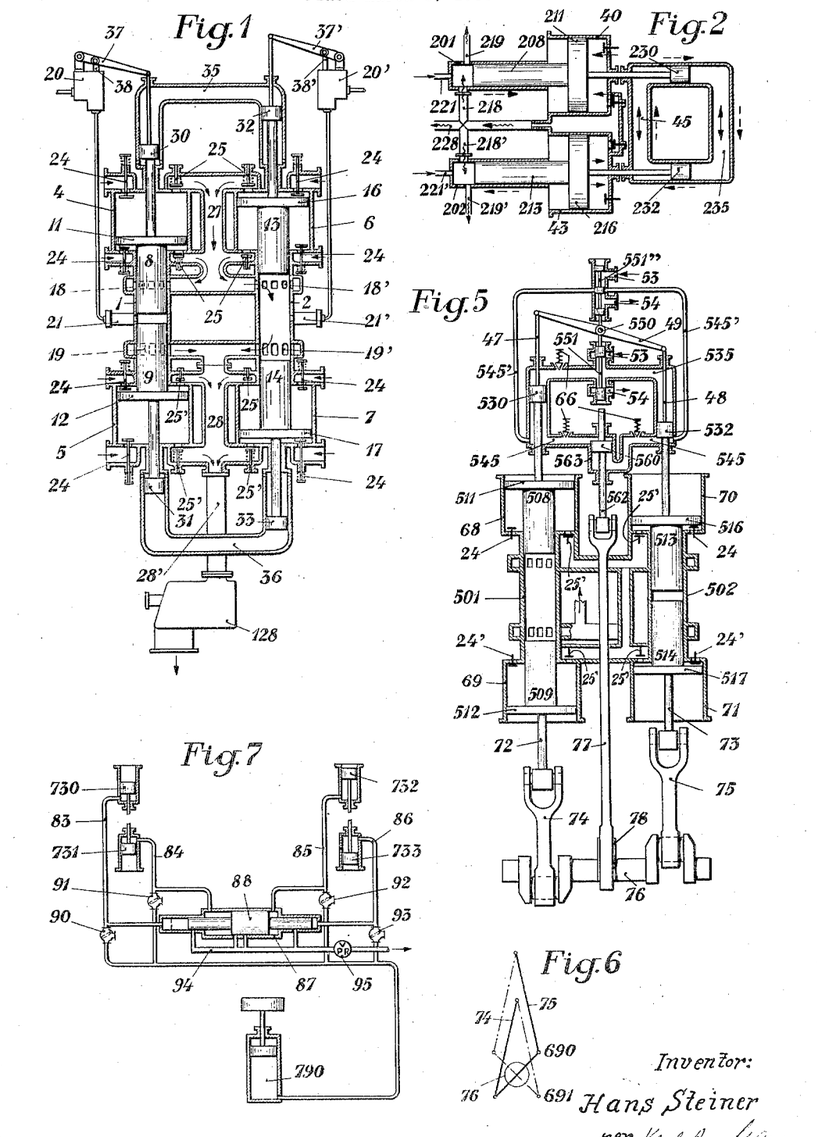
Fig. 1 schematically illustrates an internal combustion engine with floating pistons and directly associated compressor according to my invention having two combustion cylinders arranged side by side and having double-acting compressor pistons.
Fig. 2 is a schematic diagram of an engine according to my invention having single-acting power and compressor pistons.
Fig. 5 is a diagrammatic showing of my invention in which some of the power pistons are movably interconnected by a crank shaft and others by a column of liquid.
Fig. 6 is a crank diagram of an engine according to Fig. 5 of the drawings.
Fig. 7 diagrammatically shows a method and apparatus for synchronizing the motor pistons in an engine according to my invention, whereby a stepped piston is used.

Referring more particularly to Fig. 1 of the drawings, the engine according to my invention consists of the combustion cylinders 1 and 2 and the compressor cylinders 4, 5, 6, and 7. Double-action compressor pistons 11 and 12 are connected to the motor pistons 8 and 9, respectively, operating within combustion cylinder 1. Motor pistons 13 and 14 operating in cylinder 2 are connected with double-acting compressor pistons 16 and 17, respectively. Engine cylinder 1 has inlet openings 18 and outlet openings 19, and cylinder 2 has inlet openings 18' and outlet openings 19'. The fuel is supplied by the fuel pumps 20 and 20' and injected into the cylinders through valves 21 and 21'. Compressor pistons 11, 12, 16, and 17 draw the air into the compressor cylinders 4, 5, 6, and 7, respectively, through the suction valves 24. Pistons 11 and 16 push the compressed air out of cylinders 4 and 6 through the discharge valves 25 and through conduit 27 towards the admission openings 18 and 18', whereas pistons 12 and 17 operating in cylinders 5 and 7 discharge compressed air through outlet valves 25' into receiver 26 into which also the exhaust gases of the combustion cylinders 1 and 2 are conducted. The high pressure and high temperature gases collected in receiver 26 are conducted through conduit 26' into a gas turbine 128 in which they do useful work. Auxiliary pistons 30, 31, 32, and 33 are connected with pistons 8, 9, 13, and 14, respectively. A column of liquid 35 is arranged in between the pistons 30 and 32 and a column of liquid 36 between the pistons 31 and 33. Piston 30 operates piston 38 of the fuel oil pump 20 by means of lever 37, and piston 32 operates piston 38' of the fuel oil pump 20' by means of lever 37'.

In Fig. 1, the motor pistons in cylinder 1 are in the innermost dead center position, and the pistons in cylinder 2 are in the outermost dead center position. The motor cylinders operate according to the two-cycle principle, fuel injection into cylinder 1 taking place at the position of pistons 8 and 9 shown in Fig. 1, and the expansion stroke just starting, whereby pistons 8 and 9 are driven apart. Pistons 11, 12, 30, and 31 also move outwards. At this movement, air is drawn into those parts of compressor cylinders 4 and 5 which point towards each other and compressed in the outer parts of cylinders 4 and 5. Pistons 30 and 31 transmit pressure and motion to the columns of liquid 35 and 36, respectively, which transmit this pressure and movement to the pistons 32 and 33 and 13 and 14 associated with cylinder 2, so that the latter pistons move towards each other. The power transmitted to pistons 32 and 33 is used not only for doing the compression work in cylinder 2 but also for doing the work in cylinders 6 and 7, namely, drawing in and compressing air. Part of this work is accumulated in the pistons in the form of acceleration work and is transformed into compression work during the second half of the stroke, i. e., when the motion of the pistons is retarded.

When pistons 13 and 14 have approached inner dead center position, piston 38' of fuel oil pump 20' is also at the inner dead center position, and fuel injection into cylinder 2 and expansion of combustion gas begins within this cylinder. At the same time, compression is started in cylinder 1 and continues until pistons 8 and 9 have again reached inner dead center position, whereupon a new cycle of operation is carried out in the same manner as has been described.

In the embodiment of my invention according to Fig. 2 of the drawings, the motor pistons 208 and 213 operating in cylinders 201 and 202 located side by side and parallel to one another are rigidly connected with the single-acting compressor pistons 211 and 216 operating within compressor cylinders 40 and 43, respectively. The motor pistons 208 and 213 also carry double-acting auxiliary pistons 230 and 232 which are connected, by means of the columns of liquid 235 and 45 so that part of the energy of the motor piston 208, when carrying out an expansion stroke, is transmitted to piston 213 then carrying out the compression stroke, and vice versa. If piston 208 carries out an expansion stroke, part of the energy is used for accelerating pistons 208 and 211 and for compressing the air in cylinder 40. The rest of the energy is transmitted, by means of auxiliary piston 230 and the column of liquid 235 and auxiliary piston 232, to piston 213 and used for accelerating pistons 213 and 216 and for compressing the fuel-air mixture in cylinder 202. If this rest of the energy is larger than required for compressing the fuel-air mixture, and if pistons 230 and 232 were only single acting, part of the rest energy would be used for unduly accelerating piston 213—216; for this reason, means are usually provided for braking the pistons, which means waste of energy. However, by providing double acting auxiliary pistons 230 and 232, as shown in Fig. 2, accelerated piston 213—216 exerts a pulling force on piston 232 which is transmitted through column 45 to piston 230 and is then used for doing compression work in cylinder 40; in this manner, part of the kinetic energy of the piston making a compression stroke, namely, piston 213, is transmitted to the piston making an expansion stroke, namely, piston 208. This takes place when piston 213 moves through the left half of cylinder 202 and piston 208 through the right half of cylinder 201.

The solid line arrows in Fig. 2 indicate the direction and, by their size, indicate the greatness of the force, for example, lbs./square inch, acting on the motor and compressor pistons when piston 208 makes an expansion stroke and motor piston 213 makes a compression stroke, whereas the dotted line arrows indicate the direction of movement of the pistons and columns of liquid. When piston 213 carries out an expansion stroke, the direction of movement of the pistons and the columns of liquid is opposite to the direction indicated by the dotted line arrows, and the direction of the forces acting on pistons 211 and 216 is opposite to the direction shown by the solid line arrows shown in Fig. 2 adjacent to pistons 211 and 216; the length of the arrows representing the greatness of the force acting on piston 216 is then equal to the length of the arrows shown in Fig. 2 in connection with piston 211, and the length of the arrows representing the greatness of the force acting on piston 211 is then equal to the length of the arrows shown in Fig. 2 in connection with piston 216; the direction of the arrows representing the forces acting on piston 208 and 213 is the same as when piston 208 makes an expansion stroke and piston 213 a compression stroke; however, the length of the arrow representing the greatness of the force acting on piston 208 is then equal to the length of the arrow shown in Fig. 2 acting on piston 213, and the length of the arrow representing the greatness of the force acting on piston 213 is then equal to the length of the arrow shown in Fig. 2 in connection with piston 208. Air compressed in compressor cylinders 40 and 43 enters motor cylinder 201 through conduit 218 and motor cylinder 202 through conduit 218′, while part of the compressed air may be conducted through conduit 228 to another consumer. The combustion gases leave cylinder 201 through conduit 219 and cylinder 202 through conduit 219′. Fuel is supplied to cylinder 201 through conduit 221 and to cylinder 202 through conduit 221′. The small arrows indicate the flow of the compressed air, the combustion gases, and the fuel.

Figures 3, 9:
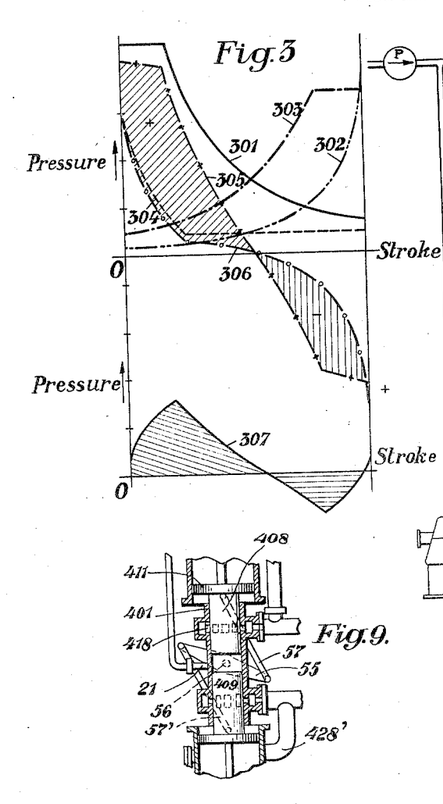
Figs. 3 is a pressure diagram of an engine according to Fig. 2.
Fig. 9 is a diagrammatic showing of motor piston synchronizing means.

In Fig. 3, the pressures acting on the motor and compressor pistons during one stroke are plotted in a rectangular coordinate system. The abscissae of the system represent the path of the pistons. The ordinates represent the pressures acting on the pistons.

Curve 301 indicates the pressure within the motor cylinder, for example cylinder 201 in Fig. 2, during the expansion stroke of piston 208; the area formed by this curve and the zero coordinates indicates the expansion work. Curve 302 indicates the compression pressures within the motor cylinders, for example, cylinder 202 in Fig. 2. Curve 303 indicates the compression pressures within the air compressor cylinders, for example cylinders 40 and 43 when pistons 211 and 216 make a compression stroke, and curve 304 indicates the expansion pressures of the compressed air remaining in the clearances of the air compressor cylinders and also the suction pressures in the air compressor cylinders. The columns of liquid are under the influence of the difference between the driving and the resisting forces acting thereon. The resulting action on the combined power and air compressor piston of one set of cylinders, for example pistons 208, 211 in cylinders 201, 40, is indicated by curve 305, which curve is obtained by deducting the values indicated by curve 303 from the values indicated by curve 301. The resulting action on the combined power and compressor pistons of the other cylinders, namely, pistons 213, 216 in cylinders 202, 43 is indicated by curve 306, which curve is obtained by deducting the values indicated by curve 302 from those indicated by curve 304. During the first part of the stroke, for example, of piston 208 in Fig. 2 making a power stroke and moving from left dead center position to the right and of piston 213 making a compression stroke and moving leftwards from right dead center position, the floating pistons 208, 211 and 213, 216 are accelerated, and during the second part of the stroke, i. e., when piston 208 approaches right and piston 213 left dead center position, their movement is retarded. Half of the difference between curves 305 and 306 is plotted as curve 307 having a lower basis in order to improve clearness of showing. Curve 307 indicates the force acting in the columns of liquid 235 and 45. At a movement of the pistons and columns of liquid indicated by dotted lines in Fig. 2, this force acts as pressure in column 235 during approximately the first half of the stroke when high pressure prevails in cylinder 201 and pistons 208, 211 tend to move faster to the right than pistons 213, 216 which must still be accelerated move to the left, and, consequently, this force acts as pull in column 45. The action is reversed in the second part of the stroke when accelerated pistons 213, 216 tend to move faster to the left than pistons 208, 211 move to the right because of the low pressure in cylinder 201 at the end of the expansion, and pull is exerted by column 235 and pressure by column 45.

In the case of an expansion stroke in cylinder 202, the character of the curves is the same and for this reason this cycle of operation is not discussed in particular.

Figure 4:
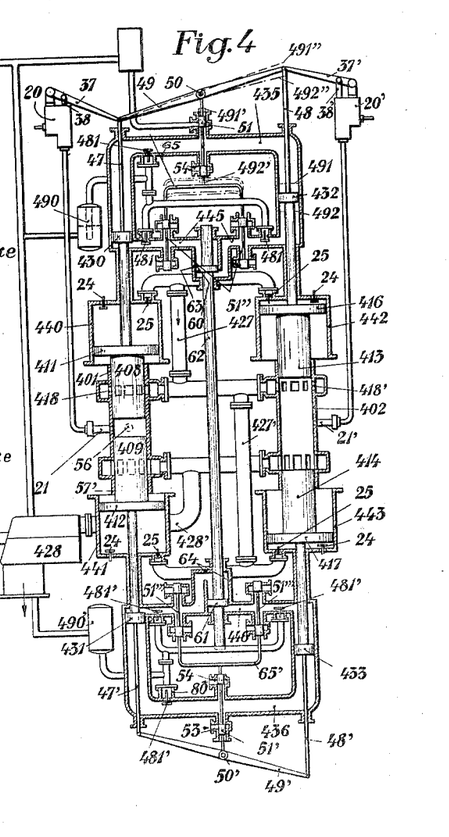
Fig. 4 is a diagrammatic showing of an engine according to my invention having piston synchronizing means comprising columns of liquid arranged intermediate the pistons.

In the embodiment of my invention according to Fig. 4 of the drawings, motor cylinder 401 is directly associated with single acting compressor cylinders 440 and 441, and motor cylinder 402 with single acting compressor cylinders 442 and 443. An expansion stroke in cylinder 401 coincides with a compression stroke in cylinder 402; the direction of power transmission by means of the column of liquid 435 between auxiliary pistons 430 and 432 and by means of column 436 between cylinders 431 and 433 is reversed during one and the same stroke.

In the first part of the expansion stroke in cylinder 401, i. e., when pistons 408 and 409 start to move outwards, the column of liquid 435 transmits pressure onto piston 432, and column 436 transmits pressure to piston 433; in the second part of the stroke, i. e., when pistons 408 and 409 move through the outer part of cylinder 401 associated with piston 413, 416 and 414, 417 there is an excess of kinetic energy over the work to be done in cylinder 402 and the suction work to be done in compressor cylinders 442 and 443, whereas there is not enough energy associated with pistons 408, 411 and 409, 412 in order to do the compression work in compressor cylinders 440 and 441. An explanation for this can be had from the diagrams in Fig. 3 just as these diagrams explain the conditions in a machine according to Fig. 2 of the drawings. When, for example, pistons 408, 411 start to move outwards, i. e., to the right as seen from the abscissa of Fig. 3, the great expansion pressure represented by the left part of curve 301 acts on said piston; the resistances against which said piston must operate at the first half of its stroke are represented by the left part of curve 303 which shows the pressure in air compression cylinder 440 and the left part of curve 302 which shows the pressure in cylinder 402; as is obvious from Fig. 3, these resistances are smaller in the first half of the stroke than the expansion pressure, and the excess energy is used for accelerating piston 413, 416; in the second half of the stroke, i. e., when piston 408, 411 moves through the outer part of cylinders 401 and 440 and piston 413, 416 moves through the inner part of cylinders 402 and 442 and through the right part of the abscissa of Fig. 3, the expansion pressure acting on cylinder 408 is small, as can be seen from the right part of curve 301, and the resistance acting on piston 411 is great, as can be seen from the right part of curve 303, and the resistance acting on piston 413 is also great, as can be seen from the right part of curve 302 in Fig. 3; the force acting on piston 408 during the outer half of its stroke is not great enough to overcome the resistances acting on said piston during said period; what keeps the piston moving to its outer dead center position is the kinetic energy imparted to the mass of piston 413, 416 during the first half of the stroke; during the second part of the stroke, a pull must be exerted by power piston 413, 416 on piston 408, 411. Since, with the embodiments of my invention described so far, liquid columns form the only connection between the exterior surfaces of pistons 430 and 432 and 431 and 433, a pull cannot be transmitted, and piston 432 would leave the column 435, and piston 433 would leave column 436. For this reason, I provide in the embodiment of my invention according to Fig. 4 of the drawings, an additional liquid column 445 connecting the inner surfaces of the pistons 430 and 432 and a column 446 connecting the inner surfaces of pistons 431 and 433; in such manner a positive connection is established between pistons 408, 411 and 413, 416 and between pistons 409, 412 and 414, 417. The energy which would act as a pull in liquid columns 435 and 436 acts as pressure energy in liquid columns 445 and 446, and the kinetic energy of the pistons 413, 416 and 414, 417 is directly transmitted to pistons 408, 411 and 409, 412. An accumulator 490 supplies columns 435 and 445 with supplementary pressure fluid to maintain the pressure in these columns. Check valves 481 prevent flow of liquid out of columns 435 and 445. In like manner, accumulator 490' supplies columns 436 and 446 and maintains their pressure. Check valves 481' prevent leakage of fluid from the columns into the accumulator. In this manner, the columns are always definitely constituted by a liquid, and the formation of air cushions or vacuum spaces is prevented.

It is essential that the length of the columns of liquid 435, 436, 445, and 446 be maintained so that the dead center position of the floating pistons is definitely determined. For this purpose, double levers 49 and 49' are provided swinging around fulcrums 50 and 50', respectively, and being operated by pistons 430 and 432 and 431 and 433, respectively, with which the double levers are connected by means of rods 47 and 48 and 47' and 48', respectively. Fulcrum 50 is at the end of a rod carrying valve 51 and fulcrum 50' at the end of a rod carrying valve 51'. As long as, for example, liquid column 435 has normal length, fulcrum 50 is not moved by the reciprocating operation of pistons 408 and 413. As soon as there is any leakage, the position of piston 430 changes with respect to that of piston 432, piston 432 moves into the position indicated by dotted lines 491, and lever 49 into the position indicated by dotted line 491" causing an outward movement of fulcrum 50. Valve 51 is then moved into the position indicated by dotted line 491' and opens passage 53 which admits liquid into the liquid column 435 from a pressure accumulator 495 which is like the one designated by numeral 490 or another source of liquid under pressure. If sufficient additional fluid is supplied through port 53, fulcrum 50 moves inwards, and valve 51 returns to its middle position and interrupts the admission of further liquid. If, for any reason, the liquid column 435 is elongated, piston 432 occupies the position indicated by dash and dot line 492. Double lever 49 then moves into the position indicated by dash and dot line 492", and fulcrum 50 and with it valve 51 move inwards as indicated by dash and dot line 492'. By this movement the outlet 54 is opened so that liquid may leave the liquid column 435 until piston 432 has returned to its correct position with respect to piston 430. Likewise, a regulating valve 51' is provided for controlling the liquid column 436.

It is essential that the length of the liquid columns 435 and 436 be combined with a maintenance of the lengths of the liquid columns 445 and 446, respectively, in order to maintain positive interlinking. For this purpose, a valve 51" is provided in that part of liquid column 445 connecting cylinder 63 with piston 430 and in the part connecting cylinder 63 with piston 432, and a valve 51'" is provided in that part of liquid column 446 which connects cylinder 64 with piston 431 and in the part connecting cylinder 64 with piston 433. Valves 51" are rigidly connected with valve 51 by means of rods 65, and valves 51'" are connected with valve 51' by means of rods 65'. Valves 51" and 51'" are arranged in such manner that a movement of valves 51 and 51' effecting an influx of liquid into the columns 435 and 436 corresponds with an outlet of fluid from columns 445 and 446 and vice versa.

In order to assure exact countermovement of the floating pistons such as 408 and 409 in cylinder 401 and of pistons 413 and 414 in cylinder 402, usually at least one piston pair operating in one of the two cylinders is associated with synchronizing means. These means effect that the pistons reach their dead center position at the same moment and that they have equal and oppositely directed velocity at every instant of their movement. The synchronizing means may consist of a mechanism as shown in Fig. 9 and comprising a double lever 55 and connecting rod 57 linked to one end of lever 55 and to piston 408 and rod 57' linked to the other end of lever 55 and to piston 409. Due to the interlinking of pistons 430 and 432 and of pistons 431 and 433, pistons 413 and 414 operating in cylinder 402 are also synchronized by the same mechanism.

Fig. 4 shows a hydraulic synchronizer comprising pistons 60 and 61 which are interconnected by rod 62. At the expansion stroke in cylinder 401 and the compression stroke in cylinder 402, piston 432 presses liquid into the column 445 and underneath piston 60, so that pistons 60 and 61 move upwards. By this movement, liquid is forced out of the upper part of the cylinders 63 and 64 and onto the inner side of pistons 430 and 431, whereby these pistons are simultaneously moved outwards. By this mechanism, the movement of liquid column 445 is made exactly like that of 446 as to direction and velocity, and the velocity of pistons 408, 409, 413, and 414 is also made equal; the direction of movement of the combined power and compressor pistons is assured to be pairwise opposite as was assured by the before described mechanical synchronizer comprising parts 55, 56, 57, and 57'.

Fuel pumps 20 are connected to piston rods 47 and 48 and supply fuel to cylinders 401 and 402 by means of feeders 21 and 21' in the same manner as was described in connection with Fig. 1. With respect to the use of the air compressed in cylinders 440, 441, 442, and 443, a variation is shown in Fig. 4 inasmuch as conduits 427 and 427' are provided conducting the compressed air from cylinders 440 and 442 and 441 and 443, respectively, to the air inlets 418 and 418' of cylinders 401 and 402, and all compressed air is used as scavenging combustion air. The combustion gas leaving cylinders 401 and 402 through discharge ports 419 and 419' is conducted into the gas turbine 428 through conduit 428'.

In the embodiment of my invention according to Fig. 5 of the drawing, motor pistons 508 and 513 are connected to single acting compressor pistons 511 and 516, respectively, operating in compressor cylinders 68 and 70 and to auxiliary pistons 530 and 532 which are interconnected by means of liquid columns 535 and 545 the further being provided with a regulating valve 551 in the same manner as in the embodiment of my invention shown in Fig. 4. Liquid columns 535 and 545 are provided with relief valves 66 which are so adjusted that they open whenever the liquid pressure in the columns exceeds the permissible operating pressure in a predetermined degree and permit liquid to escape.

This arrangement has the advantage that, at an abnormal stroke of a piston or getting stuck of a piston, the movement of the other pistons is not held up and that no damage can be done, for example, by the breaking of a connecting rod or the like, so that, after the cause of the irregularity in the operation of the piston has been removed and the hydraulic column has been refilled, the engine is at once ready to resume normal operation.

A regulating valve 551″ is provided acting in the same manner as valves 51″ in Fig. 4. Whereas the two valves 51″ in Fig. 4 are locally separated and inserted in different parts of conduit 445, regulating valve 551″ is in line with valve 551 corresponding to valve 51 in Fig. 4 and arranged on the other side of fulcrum 550 corresponding to fulcrum 50 in Fig. 4. Conduits 545′ connect the two parts of conduit 545 corresponding to the two parts of conduit 445 in Fig. 4 with valve 551″.

Pistons 509 and 514 carrying single acting compressor pistons 512 and 517 operating in cylinders 69 and 71 are interconnected by piston rods 72, 73, connecting rods 74, 75, and the crank shaft 76. Crank shaft 76 oscillates at normal reciprocating movement of the pistons 509 and 514 in between positions 690 and 691 as indicated in the crank diagram Fig. 6. For synchronizing the countermovement of pistons 508, 509 and 513, 514 in liquid column 545, a cylinder 563 with piston 560 is arranged in the same manner as is the case in the embodiment of my invention illustrated in Fig. 4. Piston 560 is connected with eccentric 78 on shaft 76 by means of piston rod 562 and eccentric rod 77, so that the movement of piston 560 is synchronized with the oscillating movement of crank shaft 76. Crank shaft 76 may also be built in such manner that it is rotated by the action of pistons 509 and 514 and that power can be taken off this shaft.

The working side of single acting compressor cylinders 68, 69, 70, and 71 is on the underside of pistons 511 and 516, and on the upper side of pistons 512 and 517, i. e., on the side facing the power cylinders 501 and 502. The working side of the compressor cylinders is provided with air inlet and outlet valves 24, 25 and 24′, 25′, whereby the outlet valves 25 and 25′ are interconnected with power cylinders 501 and 502 and the compressed air is used as combustion air for the power cylinders as shown in connection with Fig. 4.

Fig. 7 shows another form of hydraulic synchronizer which may be used instead of the synchronizer shown in Fig. 4. Synchronizing pistons 60 and 61 are united to double action truncated pistons 88. If pistons 730 and 731 corresponding to pistons 30 and 31 in Fig. 1 and to 430 and 431 in Fig. 4 move outwards, i. e., from one another, liquid is drawn from conduits 83 and 84 and from cylinder 87 on the left side of synchronizing piston 88 which moves to the left, draws liquid from conduits 85 and 86 into cylinder 87, and from the cylinders of auxiliary pistons 732 and 733 which correspond to pistons 32 and 33 in Fig. 1 and to pistons 432 and 433 in Fig. 4 and causes these pistons and the power pistons connected thereto but not shown to move inwards, i. e., towards one another.

Synchronizing piston 88 moves to the right upon outward movement of pistons 732 and 733 and inward movement of pistons 730 and 731.

The acting surfaces of the individual pistons of stepped piston 88 are of the same size so that, in every instant, the same amounts of liquid enter, respectively, leave through conduits 83, 84, 85, and 86 which connect the cylinders in which stepped piston 88 operates and the pistons 730 to 733 which also have equal acting surfaces. It is obvious that, for this reason, also the four power pistons connected to the auxiliary pistons 730 to 733 and not shown in Fig. 7 make, in every instant, motions of like velocity.

If piston 88 transmits kinetic energy from one piston pair, for example 730 and 731 and the power pistons connected thereto and not shown, to piston pair 732, 733 and the power pistons connected thereto and, if one of the latter pistons, for example 732, tends to remain behind, pressure is built up in conduit 85 by the action of piston 88. At the same time the pressure in conduit 86 is lowered, and less pressure acts on piston 733, whereas more pressure acts on piston 732. Due to this difference of power exerted on the pistons 732 and 733, piston 732 is accelerated, and the velocity of pistons 732 and 733 and the motor pistons connected thereto is equalized. The synchronizing conduits 83 to 86, inclusive, are continuously fed with liquid under pressure coming from an accumulator 790, whereby non-return valves 90 to 93, inclusive, prevent flow of liquid out of the synchronizing conduits into the accumulator. A relief conduit 94 is provided having a pressure relief valve 95 for automatically removing excess pressure and excess liquid from the system.

Figure 8:
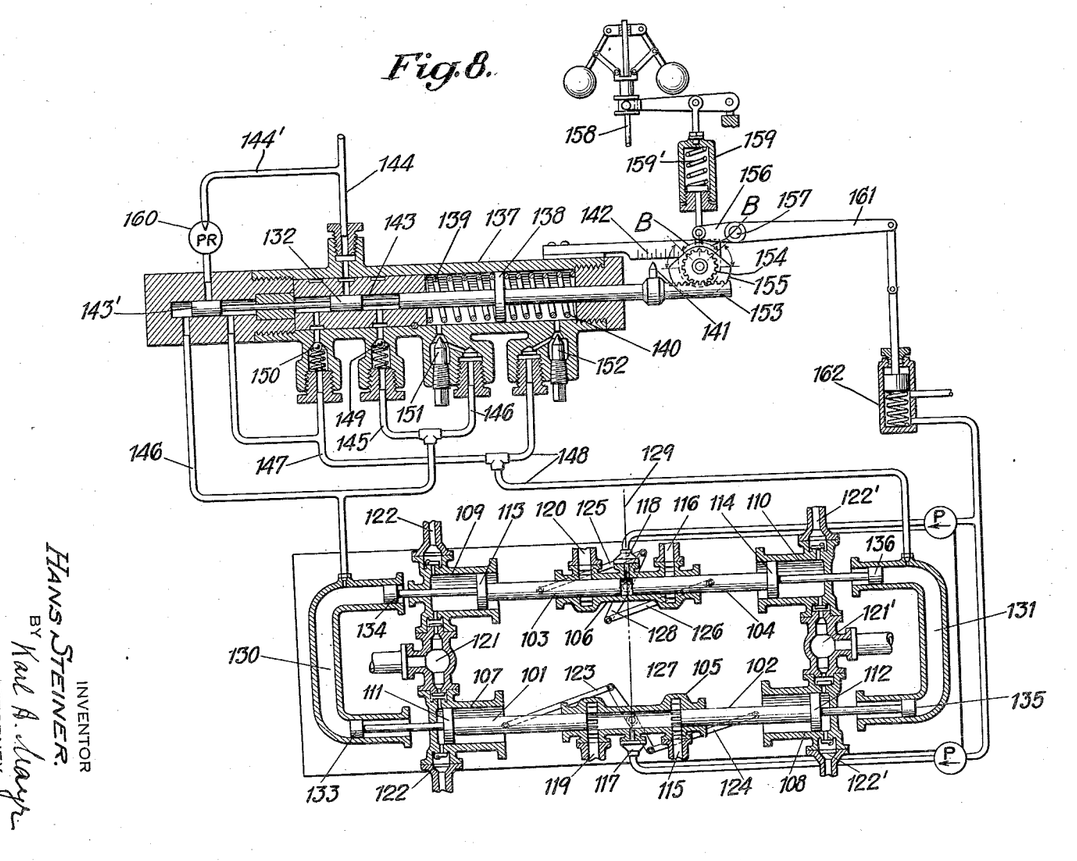
Fig. 8 diagrammatically shows a mechanism for indicating differences and irregularities in the pressures of the columns of liquid in engines according to my invention, for regulating the pressure in the columns of liquid and for bringing the engines to a standstill in cases of emergency.

Fig. 8 illustrates another embodiment of my invention. Motor pistons 101 and 102 operate in cylinder 105, and pistons 103 and 104 in cylinder 106. Compressor cylinders 107 and 108 are arranged at the ends of power cylinder 105 and compressor cylinders 109 and 110 at the ends of power cylinder 106. Motor pistons 101, 102, 103, and 104 are each connected with a compressor piston 111, 112, 113, and 114, respectively. Scavenging and combustion air is introduced into cylinder 105 through conduit 115 and into cylinder 106 through conduit 116. Fuel is introduced into cylinder 105 through fuel delivering means 117 and into cylinder 106 through means 118. The exhaust gases leave cylinder 105 through conduit 119 and cylinder 106 through conduit 120. Air is drawn into compressor cylinders 107 and 109 through T-piece 121 and into cylinders 108 and 110 through T-piece 121′. The compressed air leaves the compressor cylinders through discharge valves 122 and 122′.

For synchronizing the movement of piston pairs 101, 102 and 103, 104, synchronizing mechanisms are provided consisting of two arm levers 127 and 128 and connecting rods 123, 124 and 125, 126. These mechanisms are and act like the mechanism comprising parts 55, 56, 57, and 57′ shown in and described in connection with Fig. 4. The pistons of each pair carry out a symmetrical movement with respect to the center line 129 and reach their end and corresponding intermediary positions at the same time. Synchronization of piston pairs 101, 103 and 102, 104 is obtained by providing columns of liquid 130 and 131. For operating these columns, auxiliary pistons 133, 134, 135, and 136 are provided which are connected by means of connecting rods to compressor pistons 111, 113, 112, and 114, respectively. The machine described so far is fundamentally the same as has been described in the foregoing paragraphs.

The forces acting in the closed systems of the columns of liquid 130 and 131 and of the mechanical synchronizing provisions are dependent on the initial pressure of the liquid columns, on the working pressure of the power and compressor pistons, and on the braking forces caused by friction, throttling etc. which may vary in a substantial manner. The initial tension of the liquid columns may be changed, for example, by leakage. The working pressures of the motor pistons are subject to changes caused by variations in the fuel supply or in the scavenging and air compressing and delivering operation; furthermore, frictional forces must be encountered which depend on the quality of manufacture and of wear of the individual parts of the engine. Braking effects may be due to corrosion, carbonizing, circulation losses due to impurities etc. Changes of pressure in the liquid columns, particularly pressure differences, may cause undue loads on the mechanical parts of the engine which may even cause fractures.

In order to immediately discover and indicate such undesired operating conditions, I provide the following mechanism: a piston 138 is held in middle position within cylinder 137 by means of springs 139 and 140. The chamber to the left of piston 138 in cylinder 137 is connected with liquid column 130 by means of conduit 146, and the chamber to the right of piston 138 is connected with column 131 by means of conduit 148. If, for example, there is excess pressure in column 131 over that in column 130, piston 138 moves to the left. This movement is indicated by pointer 141 rigidly connected to piston 138. The extent of the movement can be measured on stationary scale 142.

To one side of piston 138, a regulating valve 143 is connected which distributes supplementary pressure liquid entering through conduit 144 and being supplied from a pressure accumulator or pumping system, not shown because it is not part of the present invention, into conduit 145 which is connected with the beforementioned conduit 146 and conduit 147 which is connected with the beforementioned conduit 148. In this manner, additional pressure liquid is supplied to that one of the liquid columns in which there is a deficient pressure. Valve 143 is provided with a certain amount of overlap indicated by numeral 132 so that there is no supplementary supply of pressure liquid as long as there is no predetermined pressure difference between columns of liquid 130 and 131.

Check valves 149 and 150 are provided in conduits 145 and 147.

With valve 143, a valve 143' is connected which permits pressure fluid to escape through conduit 144' from conduit 147 whenever there is excess pressure in the column of fluid 131 over that in column 130 and from conduit 146 when there is an excess pressure in column 130. In conduit 144', a pressure relief valve 160 is provided which permits fluid to escape only when the relative excess pressure exceeds a predetermined absolute value. Conduit 144' may be connected to conduit 144 so that excess fluid relieved from one column of liquid may flow back to the other column of liquid in which there is a deficiency of fluid.

Adjustable throttle means 151 and 152 may be provided in those parts of conduits 146 and 148 which are connected with cylinder 137; these throttle means serve to dampen the movements of piston 138.

The beforedescribed regulating and indicating mechanism is combined with a safety cut-out of the engine. A rack 153 is connected with piston 138. Rack 153 cooperates with pinion 154 to which a cam 155 is connected which is revolved according to the deviation of piston 138 from its middle position. If cam 155 is turned by a certain predetermined degree the angle $\beta$, it engages the end of a lever 156 and turns this lever and the operating rod 157 rigidly connected thereto. By means of rod 157, the mechanism for cutting out the engine is operated. This mechanism may consist of an arm 161 keyed to shaft 157, said arm operating a fuel supply cut-off valve 162. Whenever lever 156 is lifted by cam 155 due to an undesired excess pressure in one of the columns of liquid 130 or 131, the fuel supply to the fuel feeders 117 and 118 is shut off and the engine stopped due to lack of fuel. It is desirable that the position of lever 156 and its engagement by cam 155 depend on the speed of the engine. For this purpose, one end of lever 156 is connected to speed indicator 158 by means 159 comprising resilient provisions 159' which allow a movement of lever 156 against the position and action of speed indicator 158, in case lever 156 is engaged by cam 155, i. e., in case of emergency. The safety cut-out acts only when the supply of supplementary fluid which is controlled by valve 143 is not sufficient to balance the operation of columns 130 and 131.

While I believe the above described embodiments of my invention to be preferred embodiments, I wish it to be understood that I do not desire to be limited to the exact details of design and construction shown and described, for obvious modifications will occur to a person skilled in the art.

What is claimed is:

1. In an internal combustion engine two individual combustion cylinders, a free stroke piston in each of said cylinders, and a hydrostatic connecting means interconnecting said two pistons, whereby the movement of one of said pistons is made directly, rigidly dependent upon the movement of the other of said pistons.

2. In an internal combustion engine two individual combustion cylinders, a free stroke piston in each of said cylinders, an extension connected with each of said pistons and comprising an auxiliary piston, an auxiliary cylinder surrounding each of said auxiliary pistons, a conduit interconnecting said auxiliary cylinders and containing an operating fluid, whereby the movement of one of said free stroke pistons is transmitted to the other of said free stroke pistons and synchronous movement of all said pistons is assured.

3. In an internal combustion engine two individual combustion cylinders, a free stroke piston in each of said cylinders, an extension connected with each of said pistons and comprising an auxiliary piston, an auxiliary cylinder surrounding each of said auxiliary pistons, said free stroke pistons being individually in line with said extension and auxiliary piston connected to said free stroke pistons and said free stroke pistons being situated parallel to one another, a conduit interconnecting said auxiliary cylinders and containing an operating fluid, whereby the movement of one of said free stroke pistons is transmitted to the other of said free stroke pistons and synchronous movement of all said pistons is assured.

4. In an internal combustion engine two individual combustion cylinders, a free stroke piston in each of said cylinders, an extension connected with each of said pistons and comprising an auxiliary piston, an auxiliary cylinder surrounding each of said auxiliary pistons, a conduit interconnecting said auxiliary cylinders and having, together with said cylinders, a U-shaped configuration and containing an operating fluid, whereby the movement of one of said free stroke pistons is transmitted to the other of said free stroke pistons and synchronous movement of all said pistons is assured.

5. In an internal combution engine two individual combustion cylinders, a pair of countermoving free stroke pistons in each of said cylinders, and hydrostatic connecting means pairwise interconnecting those of said pistons which are in different cylinders, whereby the movement of those of said pistons which are connected by the same means are made rigidly dependent upon one another.

6. In an internal combustion engine a plurality of cylinders, a pair of countermoving free stroke pistons in each cylinder, hydrostatic means power-transmittingly interconnecting in pairs those of said pistons which operate in different cylinders, whereby true countermovement of the pistons interconnected by said means is assured.

7. In an internal combustion engine a plurality of power cylinders, a pair of countermoving pistons in each cylinder, a plurality of individual hydrostatic connecting means containing an operating fluid and pairwise interconnecting those of said pistons which operate in different cylinders for assuring true countermovement of the interconnected pistons, and synchronizing means connected to and interconnecting said hydrostatic connecting means, whereby synchronized motion of the fluid contained in said connecting means and of all of said countermoving pistons connected by said connecting means is assured.

8. In an internal combustion engine a plurality of cylinders, a pair of countermoving pistons in each cylinder, a plurality of individual hydrostatic connecting means containing an operating fluid and pairwise interconnecting those of said pistons which operate in different cylinders for assuring true countermovement of the interconnected pistons, each of said connecting means comprising a synchronizing piston, means interconnecting the synchronizing pistons of different ones of said hydrostatic connecting means, whereby synchronized motion of the fluid contained in said hydrostatic connecting means and of said interconnected pistons is assured.

9. In an internal combustion engine a plurality of cylinders, a pair of countermoving pistons in each cylinder, hydrostatic connecting means containing an operating fluid and pairwise interconnecting those of said pistons which operate in different cylinders for assuring true countermovement of the interconnected pistons, valve means in each of said connecting means adapted to control the supply of additional operating fluid to and the outflow of fluid from said connecting means with which said valve means are connected, control means movably connected to and interlinking those of said pistons which are interconnected by said hydrostatic connecting means, said control means comprising a fulcrum connected to and supported by said valve means and a two-arm lever adapted to swing about said fulcrum and to change the position of said fulcrum and the valve means connected thereto upon irregular operation of said pistons interlinked by said control means and to thereby change the fluid content of said hydrostatic connecting means with which the valve is associated and to regulate the operation of the pistons interlinked by said control means.

10. In an internal combustion engine a plurality of cylinders, a pair of countermoving pistons in each cylinder, hydrostatic connecting means containing an operating fluid and pairwise interconnecting said pistons, and a step piston operating in a step cylinder which is connected for fluid flow with all of said hydrostatic connecting means, whereby the action of all said hydrostatic connecting means is simultaneously controlled and the motion of all said pistons is synchronized.

11. In an internal combustion engine a plurality of cylinders, a pair of countermoving pistons in each cylinder, hydrostatic connecting means containing an operating fluid and pairwise interconnecting said pistons, a step piston operating in a step cylinder which is connected for fluid flow with all of said hydrostatic connecting means, whereby the action of all of said hydrostatic connecting means is simultaneously controlled and the motion of all of said pistons is synchronized, and a source of constant pressure fluid connected with each of said hydrostatic connecting means, whereby constant and equal fluid pressure is maintained in all of said hydrostatic connecting means.

12. In an internal combustion engine a plurality of cylinders, a pair of countermoving pistons in each cylinder, hydrostatic connecting means containing an operating fluid and pairwise interconnecting said pistons, said hydrostatic connecting means comprising a plurality of columns of fluid individually interconnecting pairs of said pistons, a step cylinder, and conduits individually interconnecting said columns of fluid and the individual steps of said step cylinder for fluid flow, and a step piston adapted to reciprocatingly move within said step cylinder, whereby the motion of all of said columns of fluid and of the pistons associated therewith is simultaneously controlled.

13. In an internal combustion engine a plurality of cylinders, a pair of countermoving pistons in each cylinder, hydrostatic connecting means containing an operating fluid and pairwise interconnecting said pistons, said hydrostatic connecting means comprising a plurality of columns of fluid individually interconnecting pairs of said pistons, a step cylinder, and conduits individually interconnecting said columns of fluid and the individual steps of said step cylinder for fluid flow, and a step piston adapted to reciprocatingly move within said step cylinder, whereby the motion of all of said columns of fluid and of the pistons associated therewith is simultaneously controlled, and fluid outlet ports in the individual steps of said step piston, which ports are adapted to be opened and closed by said step piston, whereby removal of excess operating fluid is automatically controlled and building up of excess pressure is prevented.

14. In an internal combustion engine a plurality of cylinders, a pair of countermoving pistons in each cylinder, hydrostatic connecting means containing an operating fluid and pairwise interconnecting said pistons, said hydrostatic connecting means comprising a plurality of columns of fluid individually interconnecting pairs of said pistons, a step cylinder, and conduits individually interconnecting said columns of fluid and the individual steps of said step cylinder for fluid flow, and a step piston adapted to reciprocatingly move within said step cylinder, whereby the motion of all of said columns of fluid and of the pistons associated therewith is simultaneously controlled, fluid outlet ports in the individual steps of said step piston, fluid relief conduits connected to said ports, said step piston being adapted to open and close said ports and to periodically cause operating fluid to escape, and a pressure relief valve connected to and common to all of said fluid relief conduits, whereby outflow of operating fluid from said ports and conduits is made dependent upon the existence of a predetermined pressure within said conduits.

15. In an internal combustion engine a plurality of individual cylinders, a pair of countermoving free stroke pistons in each cylinder, a plurality of individual hydrostatic connecting means containing operating fluid and pairwise interconnecting said pistons, and indicating means connected and common to at least two of said hydrostatic connecting means and adapted to indicate differences between the pressure of the fluid in said hydrostatic connecting means to which said indicating means are connected.

16. In an internal combustion engine a plurality of cylinders, a pair of countermoving pistons in each cylinder, a plurality of individual hydrostatic connecting means containing an operating fluid and pairwise interconnecting said pistons, and fluid pressure equalizing means connected to a plurality of said hydrostatic connecting means, whereby the fluid pressure in those of said hydrostatic connecting means to which said equalizing means are connected is equalized.

17. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressures of the hydrostatic connecting means to which said pressure sensitive means are connected, and fluid distributing means connected to and adapted to be operated by said pressure sensitive means and to supply pressure fluid to that one of said hydrostatic connecting means connected with said pressure sensitive means in which the fluid pressure is lower than the fluid pressure in the other hydrostatic connecting means connected to the same pressure sensitive means.

18. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressures of the hydrostatic connecting means to which said pressure sensitive means are connected, and fluid distributing means connected to and adapted to be operated by said pressure sensitive means and to supply pressure fluid to that one of said hydrostatic connecting means connected with said pressure sensitive means in which the fluid pressure is lower than the fluid pressure in the other hydrostatic connecting means connected to the same pressure sensitive means and to cause operating fluid to escape from said hydrostatic connecting means if and when the fluid pressure in said hydrostatic connecting means exceeds a predetermined value.

19. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressures of the hydrostatic connecting means to which said pressure sensitive means are connected, and fluid distributing means connected to and adapted to be operated by said pressure sensitive means and to supply pressure fluid to that one of said hydrostatic connecting means connected with said pressure sensitive means in which the fluid pressure is lower than the fluid pressure in the other hydrostatic connecting means connected to the same pressure sensitive means and to cause operating fluid to escape from said hydrostatic connecting means if and when the fluid pressure in said hydrostatic connecting means and the pressure difference between the fluid pressures in those of said hydrostatic connecting means which are connected to said pressure sensitive means exceeds a predetermined value.

20. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressure of the hydrostatic connecting means to which said pressure sensitive means are connected, and valve means connected to and adapted to be operated by said pressure sensitive means and to cause operating fluid to escape from said hydrostatic connecting means if and when the pressure in said hydrostatic connecting means exceeds a predetermined value.

21. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressures of the hydrostatic connecting means to which said pressure sensitive means are connected, and stop means connected to and adapted to be operated by said pressure sensitive means and to stop said internal combustion engine if and when the difference of the fluid pressures exceeds a predetermined value.

22. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressure of the hydrostatic connecting means to which said pressure sensitive means are connected, and fuel supply cut-off means connected to and adapted to be operated by said pressure sensitive means and to cut off the fuel supply to said internal combustion engine if and when the difference of fluid pressures exceeds a predetermined value.

23. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressure of the hydrostatic connecting means to which said pressure sensitive means are connected, speed control means for controlling the speed of said engine, stop means connected to and adapted to be operated by said pressure sensitive means and to stop said engine if and when the difference of fluid pressures exceeds a predetermined value, and a one-way coupling connecting said stop means and said speed control means and permitting operation of said stop means independently from said speed control means.

24. In an internal combustion engine a plurality of cylinders, a pair of countermoving pistons in each cylinder, a plurality of individual hydrostatic connecting means containing an operating fluid and pairwise interconnecting said pistons, pressure sensitive means connected to a plurality of said hydrostatic connecting means and adapted to respond to differences between the fluid pressure of the hydrostatic connecting means to which said pressure sensitive means are connected, and valve means connected to and adapted to be operated by said pressure sensitive means and to interconnect those of said hydrostatic connecting means for fluid flow to which said pressure sensitive means are connected if and when the difference of the fluid pressures exceeds a predetermined value.

25. In an internal combustion engine two individual combustion cylinders, a free stroke reciprocating piston in each of said cylinders, and a hydrostatic connecting means positively interconnecting said two pistons and acting in both directions of movement of said pistons, whereby the movement in both directions of one of said pistons is made directly, rigidly dependent upon the movement in both directions of the other of said pistons.

26. In an internal combustion engine two individual combustion cylinders, a free stroke reciprocating piston in each of said cylinders, an extension connected with each of said pistons and comprising an auxiliary double-acting piston, an auxiliary cylinder surrounding each of said auxiliary pistons and having two operating ends, conduits individually interconnecting corresponding ends of said auxiliary cylinders, said conduits containing an operating fluid, whereby the movement of one of said free stroke pistons is transmitted in both directions to the other of said free stroke pistons and synchronous movement in both directions of all said pistons is assured.

27. In an internal combustion engine two individual combustion cylinders, a pair of countermoving free stroke pistons in each of said cylinders, and hydrostatic connecting means pairwise positively interconnecting those of said pistons which operate in different cylinders for assuring true countermovement of the interconnected pistons and acting in both directions of movement of said pistons, whereby the movement in both directions of one of said pistons is made directly, rigidly dependent upon the movement in both directions of the other of said pistons.

HANS STEINER.